US006458731B1

(12) United States Patent
Rosenflanz (10) Patent No.: US 6,458,731 B1
(45) Date of Patent: *Oct. 1, 2002

(54) FUSED ALUMINUM OXYCARBIDE/ NITRIDE-AL$_2$O$_3$·Y$_2$O$_3$ EUTECTIC MATERIALS

(75) Inventor: Anatoly Z. Rosenflanz, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 68 days.

This patent is subject to a terminal disclaimer.

(21) Appl. No.: 09/619,215

(22) Filed: Jul. 19, 2000

(51) Int. Cl.$^7$ ..................... C04B 35/107; C04B 35/117; C04B 35/111
(52) U.S. Cl. ................. 501/87; 501/126; 501/127; 501/153; 501/152; 501/96.1; 264/332
(58) Field of Search ........................... 51/307, 309, 295; 501/126, 127, 153, 152, 87, 96.1, 105, 118, 119, 125, 96.4; 264/332

(56) References Cited

U.S. PATENT DOCUMENTS

| | | |
|---|---|---|
| 659,926 A | 10/1900 | Jacobs |
| 906,339 A | 12/1908 | Tone |
| 960,712 A | 6/1910 | Saunders |
| 1,037,999 A | 9/1912 | Saunders |
| 1,107,011 A | 8/1914 | Allen |
| 1,149,064 A | 8/1915 | Kalmus |
| 1,161,620 A | 11/1915 | Coulter |
| 1,192,709 A | 7/1916 | Tone |
| 1,240,490 A | 9/1917 | Saunders et al. |
| 1,247,337 A | 11/1917 | Saunders et al. |
| 1,257,356 A | 2/1918 | Hutchins |
| 1,263,708 A | 4/1918 | Saunders et al. |
| 1,263,709 A | 4/1918 | Saunders et al. |
| 1,263,710 A | 4/1918 | Saunders et al. |
| 1,268,532 A | 6/1918 | Allen |
| 1,268,533 A | 6/1918 | Allen |
| 1,314,061 A | 8/1919 | Harrison |
| 1,339,344 A | 5/1920 | Hutchins |
| 1,402,714 A | 1/1922 | Brockbank |
| 1,448,586 A | 3/1923 | Allen |
| 1,910,444 A | 5/1933 | Nicholson |
| 2,000,857 A | 5/1935 | Masin |
| 2,424,645 A | 7/1947 | Baumann, Jr. et al. |
| 2,618,567 A | 11/1952 | Comstock, 3rd |
| 2,958,593 A | 11/1960 | Hoover et al. |
| 2,961,296 A | 11/1960 | Fenerty |
| 3,041,156 A | 6/1962 | Rowse et al. |
| 3,141,747 A | 7/1964 | Marshall |
| 3,181,939 A | 5/1965 | Marshall et al. |
| 3,216,794 A | 11/1965 | Roschuk |
| 3,377,660 A | 4/1968 | Marshall et al. |
| 3,498,769 A | 3/1970 | Coes, Jr. |
| 3,646,713 A | 3/1972 | Marshall et al. |
| 3,726,621 A | 4/1973 | Cichy |
| 3,781,172 A | 12/1973 | Pett et al. |
| 3,792,553 A | 2/1974 | Schleifer et al. |
| 3,881,282 A | 5/1975 | Watson |
| 3,891,408 A | 6/1975 | Rowse et al. |
| 3,893,826 A | 7/1975 | Quinan et al. |
| 3,916,584 A | 11/1975 | Howard et al. |
| 3,973,977 A | 8/1976 | Wilson |
| 3,996,702 A | 12/1976 | Leahy |
| 4,035,162 A | 7/1977 | Brothers et al. |
| 4,049,397 A | 9/1977 | Bockstiegel et al. |
| 4,070,796 A | 1/1978 | Scott |
| 4,073,096 A | 2/1978 | Ueltz et al. |
| 4,111,668 A | 9/1978 | Walker et al. |
| 4,126,429 A | 11/1978 | Watson |
| 4,140,494 A | 2/1979 | Coes, Jr. |
| 4,157,898 A | 6/1979 | Walker et al. |
| 4,194,887 A | 3/1980 | Ueltz et al. |
| 4,311,489 A | 1/1982 | Kressner |
| 4,314,827 A | 2/1982 | Leitheiser et al. |
| 4,341,533 A | 7/1982 | Daire et al. |
| RE31,128 E | 1/1983 | Walker et al. |
| 4,415,510 A | 11/1983 | Richmond |
| 4,439,845 A | 3/1984 | Geohegan, Jr. et al. |
| 4,457,767 A | 7/1984 | Poon et al. |
| RE31,725 E | 11/1984 | Walker et al. |
| 4,518,397 A | 5/1985 | Leitheiser et al. |
| 4,543,107 A | 9/1985 | Rue |

(List continued on next page.)

FOREIGN PATENT DOCUMENTS

| | | |
|---|---|---|
| DE | 134 638 A | 3/1979 |
| EP | 0 480 678 A | 4/1992 |
| EP | 0 579 281 A1 | 1/1994 |
| EP | 0 647 601 A1 | 4/1995 |
| EP | 0 722 919 A1 | 7/1996 |
| JP | 59 22 7726 A | 12/1984 |
| JP | 06 040765 A | 2/1994 |
| JP | 10-208229 | 2/2000 |
| JP | 10-208244 | 2/2000 |
| WO | WO 00/34201 | 6/2000 |

OTHER PUBLICATIONS

U.S. Patent Application entitled "Al$_2$O$_3$–Rare Earth Oxide–ZrO$_2$/HfO$_2$ Materials, And Methods Of Making And Using The Same", filed Aug. 2, 2001, Anatoly Z. Rosenflanz, having Attorney Docket No. 56400US002.

U.S. Patent Application entitled "Al$_2$O$_3$–Y$_2$O$_3$–ZrO$_2$/HfO$_2$ Materials, And Methods Of Making And Using The Same", filed Aug. 2, 2001, Anatoly Z. Rosenflanz, having Attorney Docket No. 56468US002.

U.S. Patent Application entitled "Method of Making Ceramic Articles", filed Aug. 2, 2001, Anatoly Z. Rosenflanz, having Attorney Docket No. 56938US002.

(List continued on next page.)

Primary Examiner—Michael Marcheschi
(74) Attorney, Agent, or Firm—Gregory D. Allen (57) ABSTRACT

Fused, crystalline eutectic material comprising aluminum oxycarbide/nitride-Al$_2$O$_3$·Y$_2$O$_3$ eutectics. Examples of useful articles comprising the fused eutectic material include fibers and abrasive particles.

26 Claims, 4 Drawing Sheets

U.S. PATENT DOCUMENTS

| | | |
|---|---|---|
| 4,588,419 A | 5/1986 | Caul et al. |
| 4,595,663 A | 6/1986 | Krohn et al. |
| 4,623,364 A | 11/1986 | Cottringer et al. |
| 4,652,275 A | 3/1987 | Bloecher et al. |
| 4,734,104 A | 3/1988 | Broberg |
| 4,737,163 A | 4/1988 | Larkey |
| 4,741,743 A | 5/1988 | Narayanan et al. |
| 4,744,802 A | 5/1988 | Schwabel |
| 4,751,137 A | 6/1988 | Halg et al. |
| 4,752,459 A | 6/1988 | Pepper |
| 4,770,671 A | 9/1988 | Monroe et al. |
| 4,780,268 A | 10/1988 | Papsi et al. |
| 4,799,939 A | 1/1989 | Bloecher et al. |
| 4,800,685 A | 1/1989 | Haynes, Jr. |
| 4,881,951 A | 11/1989 | Wood et al. |
| 4,898,587 A | 2/1990 | Mera |
| 4,898,597 A | 2/1990 | Hay et al. |
| 4,960,441 A | 10/1990 | Pellow et al. |
| 4,997,461 A | 3/1991 | Markhof-Matheny et al. |
| 5,009,675 A | 4/1991 | Kunz et al. |
| 5,011,508 A | 4/1991 | Wald et al. |
| 5,013,696 A | 5/1991 | Greskovich et al. |
| 5,023,212 A | 6/1991 | Dubots et al. |
| 5,038,453 A | 8/1991 | Kurita et al. |
| 5,042,991 A | 8/1991 | Kunz et al. |
| 5,085,671 A | 2/1992 | Martin et al. |
| 5,090,968 A | 2/1992 | Pellow |
| 5,094,672 A | 3/1992 | Giles, Jr. et al. |
| 5,110,332 A | 5/1992 | Isaksson |
| 5,118,326 A | 6/1992 | Lee et al. |
| 5,131,926 A | 7/1992 | Rostoker et al. |
| 5,139,978 A | 8/1992 | Wood |
| 5,143,522 A | 9/1992 | Gibson et al. |
| 5,152,917 A | 10/1992 | Pieper et al. |
| 5,201,916 A | 4/1993 | Berg et al. |
| 5,203,884 A | 4/1993 | Buchanan et al. |
| 5,203,886 A | 4/1993 | Sheldon et al. |
| 5,227,104 A | 7/1993 | Bauer |
| 5,259,147 A | 11/1993 | Falz et al. |
| 5,282,875 A | 2/1994 | Wood et al. |
| 5,312,789 A | 5/1994 | Wood |
| 5,336,280 A | 8/1994 | Dubots et al. |
| 5,352,254 A | 10/1994 | Celikkaya |
| 5,366,523 A | 11/1994 | Rowenhorst et al. |
| 5,372,620 A | 12/1994 | Rowse et al. |
| 5,376,470 A | 12/1994 | Sprouse |
| 5,378,251 A | 1/1995 | Culler et al. |
| 5,417,726 A | 5/1995 | Stout et al. |
| 5,427,595 A | 6/1995 | Pihl et al. |
| 5,429,647 A | 7/1995 | Larmie |
| 5,431,704 A | 7/1995 | Tamamaki et al. |
| 5,436,063 A | 7/1995 | Follett et al. |
| 5,443,906 A | 8/1995 | Pihl et al. |
| 5,496,386 A | 3/1996 | Broberg et al. |
| 5,498,269 A | 3/1996 | Larmie |
| 5,520,711 A | 5/1996 | Helmin |
| 5,547,479 A | 8/1996 | Conwell et al. |
| 5,549,962 A | 8/1996 | Holmes et al. |
| 5,551,963 A | 9/1996 | Larmie |
| 5,593,467 A | 1/1997 | Monroe |
| 5,609,706 A | 3/1997 | Benedict et al. |
| 5,651,925 A | 7/1997 | Ashley et al. |
| 5,665,127 A | 9/1997 | Moltgen et al. |
| 5,679,067 A | 10/1997 | Johnson et al. |
| 5,725,162 A | 3/1998 | Garg et al. |
| 5,738,696 A | 4/1998 | Wu |
| 5,782,940 A | 7/1998 | Jayan et al. |
| 5,863,308 A | 1/1999 | Qi et al. |
| 5,876,470 A | 3/1999 | Abrahamson |
| 5,902,763 A | 5/1999 | Waku et al. |
| 5,903,951 A | 5/1999 | Ionta et al. |
| 5,954,844 A | 9/1999 | Law et al. |
| 5,961,674 A | 10/1999 | Gagliardi et al. |
| 5,975,988 A | 11/1999 | Christianson |
| 5,981,415 A | 11/1999 | Waku et al. |

OTHER PUBLICATIONS

U.S. Patent Application entitled "Abrasive Particles, And Methods Of Making And Using The Same", filed Aug. 2, 2001, Anatoly Z. Rosenflanz, having Attorney Docket No. 56931US002.

Abstract for "Kinetics of Nonisothermal Sintering of Some Eutectic Oxide Compositions," I. Yu Volkova et al., 1986 (abstract from Database Chemabs 'Online! Chemical Abstracts Service, Columbus, Ohio, US). no month.

"Eutectic Precipitation of the Spinel Solid Solution–Yttrium Aluminum Garnet (YAG) System," Shuqiang Wang et al., *Journal of the American Ceramic Society*, 1998, vol. 81, No. 1, pp. 263–265. no month.

"Microstructures of laser–treated $Al_2O_3$–$ZrO_2$–$CeO_2$ composites," Zan–Hwey Chen et al., *Materials Science & Engineering A (Structural Materials: Properties, Microstructure and Processing)*, 1995, vol. A196, No. 1–2, pp. 253–260. no month.

"Advances in the Grinding Efficiency of Sintered Alumina Abrasives," Andreas Krell et al., *Journal of the American Ceramic Society*, 1996, vol. 79, No. 3, pp. 763–769. no mo.

"Interface modification for increased fracture toughness in reaction–formed yttrium aluminum garnet/alumina eutectic composites," Luke N. Brewer et al., 1999, vol. 14, No. 10, pp. 3907–3912. no month.

Dow Jones Interactive Internet Printout on Jun. 20, 2001 for web address "http://ptg.djnr.com/ccroot/asp/publib/story.asp"; "China's Rare Earth Industry In the Doldrums", Asia Pulse, Jan. 28, 1999, 2 pages.

Dow Jones Interactive Internet Printout on Jun. 20, 2001 for web address "http://ptg.djnr.com/ccroot/asp/publib/story.asp"; "China's Rare Earth Export Quota Set at 45,000 Tons", Asia Pulse, Jan. 9, 2001, 1 page.

Dow Jones Interactive Internet Printout on Jun. 20, 2001 for web address "http://ptg.djnr.com/ccroot/asp/publib/story.asp"; "Elements: China to Impose Quotas on Rare Earth Exports", Chemical Business NewsBase, Feb. 4, 1999, 1 page.

Dow Jones Interactive Internet Printout on Jun. 20, 2001 for web address "http://ptg.djnr.com/ccroot/asp/publib/story.asp"; "Rare Earth Prices and Market Outlook", Chemical Business NewsBase, May 27, 1999, 2 pages.

Dow Jones Interactive Internet Printout on Jun. 20, 2001 for web address "http://ptg.djnr.com/ccroot/asp/publib/story.asp"; "In Asia", Engineering & Mining Journal, Feb. 28, 2000, 4 pages.

Dow Jones Interactive Internet Printout on Jun. 20, 2001 for web address "http://ptg.djnr.com/ccroot/asp/publib/story.asp"; "Rare Earths: An Industry Review and Market Outlook—Part 1", Chemical Business NewsBase, Dec. 8, 2000, 2 pages.

Dow Jones Interactive Internet Printout on Jun. 20, 2001 for web address "http://ptg.djnr.com/ccroot/asp/publib/story.asp"; "Traders' View on Chemical Business (Part 2): Rare Earth: Market Confusion Inevitable Due to China's Unstable Supply", Chemical Business NewsBase, Aug. 10, 2000, 2 pages.

"China: Oversupply Puts Rare Earths Projects On Hold", Industrial Minerals, Aug., 1997, 1 page.

"Increase in Value of Rare Earth Products Boosts Yixing Xinwei", W. Yau, South China Morning Post, Apr. 12, 2000, 2 pages.

"Rare Earth—Market Confusion Inevitable Due to China's Unstable Supply", Japan Chemical Week, vol. 41, No. 2080, Jul. 6, 2000, pp. 6–7.

"Rare Earths Prices Recover Despite China's Overcapacity", Louise Rodriquez, America Metal Market, vol. 109, No. 14, Jan. 22, 2001, p. 13.

"Prices: Minerals", Asian Ceramics & Glass, Jan. 2001, 2 pages.

"China Rare Earth Information", China Rare Earth Information Center, vol. 6, No. 4, Aug. 2000, 3 pages.

"Microstructure and Thermal Stability of $Al_2O_3/Y_3Al_5O_{12}$ (YAG) Eutectic Composite Prepared by an Arc Discharge Method", T. Isobe et al., J. Ceram. Soc. Jap., 109, [1], 2001, pp. 66–70, Abstract in English. no month.

"Divorced Eutectic and Interface Characteristics in a Solidified YAG–Spinel Composite With Spinel–Rich Composition", S. Wang et al., J. Mat. Sci., 35, 2000, pp. 2757–2761. no month.

"Processing, Microstructure, and Strength of Alumina–YAG Eutectic Polycrystals", Tai–Il Mah et al., J. Am. Ceram. Soc., 83, [8], 2000, pp. 2088–2090. no month.

"Phase Identification of $Al_2O_3/RE_3Al_5O_{12}$ and $Al_2O_3/REAlO_3$ (RE = Sm–Lu, Y) Eutectics", J. Crystal Growth, 218, 2000, pp. 67–73. no month.

"Crystallization and Thermal Properties of $Al_2O_3$–$Y_2O_3$ Melts", S. V. Stankus et al., J. Crystal Growth, 167, 1996, pp. 165–170. no month.

Dialog (R) file 319: Chem Bus NewsBase (c) 2001 Royal Soc Chemistry. Abstract for "China: Oversupply Puts Rare Earths Projects On Hold", Industrial Minerals n 359, p. 10. no month.

"Rare–Earth Metals", J. Hedrick, pp. 61.1–61.6, 1997. no month.

"Rare–Earth Metal Prices in the USA ca. 1960 to 1994", J. Hedrick, J. Alloys and Compounds, 1997, pp. 471–481. no month.

U.S. Patent Application entitled "Fused $Al_2O_3$–MgO–Rare Earth Oxide Eutectic Abrasive Particles, Abrasive Articles, And Methods Of Making And Using The Same", filed Jan. 30, 2001, Rosenflanz having Attorney Docket No. 55353USA8C.005.

"Preliminary data on subsolidus phase equilibria in the $La_2O_3$–$Al_2O_3$–$Mn_2O_3$ and $La_2O_3$–$Al_2O_3$–$Fe_2O_3$ systems", Hrovat et al., Journal of Materials Science Letters, vol. 14, 1995, pp. 265–267 no month.

"A New Ceramic Eutectic Composite with High Strength at 1873 K", Yoshiharu Waku, Advanced Materials, vol. 10, No. 8, 1998, pp. 615–617 no month.

"Synthesis of Y–Al Garnet", Krokhin et al., Glass and Ceramics, vol. 55, Nos. 5–6, 1998, pp. 151–152. no month.

"High–temperature strength and thermal stability of a uni-directionally solidified $Al_2O_3$/YAG eutectic composite", Waku et al. no date.

"Sapphire matrix composites reinforced with single crystal VAG phases", Waku et al., Journal of Mate Science, vol. 31, 1996, pp. 4663–4670 no month.

"Thermo–Mechanical Stability Of Directionally Solidified $Al_2O_3$–$ZrO_2(Y_2O_3)$ Eutectic Fibers", Yang a Zhu, Scripta Materialia, vol. 36, No. 8, 1997, pp. 961–966 no month.

"A ductile ceramic eutectic composite with high strength at 1,873 K", Waku et al., Nature, vol. 389, Sep. 1997, pp. 49–52.

"The Liquidus Surface In The $Al_2O_3$–$ZrO_2$–$Y_2O_3$ Phase Diagram", Lakiza et al., Powder Metallurgy and Metal Ceramics, vol. 33, No. 11–12, 1994, pp. 595–597. no month.

"Powder–Material Research Methods And Properties Polythermal Sections Of The $Al_2O_3$–$ZrO_2$–$Y_2O_3$ Phase Diagram", Lakiza et al., Powder Metallurgy and Metal Ceramics, vol. 34, No. 11–12, 1995, pp. 655–659 no month.

"Metastable Phase Relationships In The System $Al_2O_3$–$ZrO_2$–$Y_2O_3$", Lakiz and Lopato, Powder Metallurgy and Metal Ceramics, vol. 35, Nos. 11–12, 1996, pp. 621–626 no month.

"Solidus Surface And Phase Equilibria During The Solidification Of Alloys In The $Al_2O_3$–$ZrO_2$–$Y_2O_3$ System", Lakiza et al., Powder Metallurgy and Metal Ceramics, vol. 34, Nos. 1–2, 1995, pp. 64–67 no month.

"Methods Of Investigation Of Properties Of Powder Materials, Interactions In The $Al_2O_3$–$ZrO_2$–$Y_2O_3$ System", Lakiza et al., Powder Metallurgy and Metal Ceramics, vol. 33, Nos. 9–10, 1994, pp. 486–490 no month.

Figs. 311, 346, 350, 354–56, 373, and 716, Phase Diagrams For Ceramists, The American Ceramic Society, 1964, pp. 122, 136, 138, 140, 144, 248. no month.

Figs. 2340–44, 2363, 2370, 2374–75, 2382–83, 2385, 2387, 2390, and 2392, Phase Diagrams For Ceramists, 1969 Supplement, The American Ceramic Society, 1969, pp. 95–96, 100, 102–103, 105–108. no month.

Figs. 4366–71, 4377–78, 4404–05, 4417, 4426, 4430, 4433, 4437, 4440, 4444, 4457, 4572, and 4602, Phase Diagrams For Ceramists, 1975 Supplement, The American Ceramic Society, 1975, pp. 130–132, 135–136, 147, 152, 157, 159–160, 163–164, 166, 172–173, 238, 257. no month.

Figs. 5042, 5211, 5217, 5224, 5228, 5232, 5239, 5241, 5245, 5251, 5257, 5418, and 5437, Phase Diagrams For Ceramists, vol. IV, The American Ceramic Society, 1981, pp. 29, 125, 127, 129–131, 133, 135–137, 139, 141, 143, 220, 228. no month.

Fig. 6464, Phase Diagrams For Ceramists, vol. VI, The American Ceramic Society, 1981, p. 162. no month.

Figs. 9262, and 9264, Phase Diagrams For Ceramists, vol. XI, Oxides, The American Ceramic Society, 1995, pp. 105–106. no month.

"Phase Equilibria in the Yttrium Oxide–Alumina System", Toropov et al., Bulletin of the Academy of Sciences, USSR, Division of Chemical Science, No. 7, Jul., 1964, pp. 1076–1081, A translation of Seriya Khimicheskaya.

FUSED ALUMINUM OXYCARBIDE/NITRIDE-$Al_2O_3.Y_2O_3$ EUTECTIC MATERIALS

FIELD OF THE INVENTION

This invention pertains to fused material comprised of aluminum oxycarbide/nitride-$Al_2O_3.Y_2O_3$ eutectics. Examples of useful articles comprising fused aluminum oxycarbide/nitride-$Al_2O_3.Y_2O_3$ eutectic material include fibers and abrasive particles.

DESCRIPTION OF RELATED ART

A variety of fused eutectic metal oxide materials are known in the art, including binary and ternary eutectic materials. Fused eutectic metal oxide materials are typically made by charging a furnace with sources of the various metal oxides, as well as other desired additives, heating the material above its melting point, and cooling the melt to provide a solidified mass (see, e.g., U.S. Pat. Nos. 1,161,620 (Coulter), 1,192,709 (Tone), 1,247,337 (Saunders et al.), 1,268,533 (Allen), 2,424,645 (Baumann et al.) 3,891,408 (Rowse et al.), 3,781,172 (Pett et al.), 3,893,826 (Quinan et al.), 4,126,429 (Watson), 4,457,767 (Poon et al.), 5,143,522 (Gibson et al) 5,023,212 (Dubots et. al), and 5,336,280 (Dubots et. al)).

There is, however, a continuing desire for new materials which may offer performance characteristics (including combinations of characteristics) that are different than conventional materials, are easier to make, and/or cheaper to make.

SUMMARY OF THE INVENTION

The present invention provides a fused, crystalline eutectic material comprising eutectic of at least (i) crystalline, complex $Al_2O_3.Y_2O_3$, and (ii) at least one of aluminoxy-D or M-aluminoxy-D, wherein D is at least one of carbide or nitride, and M is at least one metal cation other than Al (e.g., at least one of Ti, Mg, Sr, Ca, Ba, Zr, or Sc). Preferably, a fused, crystalline material according to the present invention comprises, on a theoretical oxide basis, at least 30 percent (or even at least 40, 50, 60, 70, 80, or 90 percent) by weight $Al_2O_3$, based on the total metal oxide, metal carbide, and metal nitride content of the material.

In another aspect, preferred crystalline complex $Al_2O_3.Y_2O_3$ is yttrium aluminate exhibiting a garnet crystal structure. Preferred eutectics may include $Al_3O_3N$-yttrium aluminate exhibiting a garnet crystal structure and $Al_2OC$-yttrium aluminate exhibiting a garnet crystal structure eutectics.

In this application:
"simple metal oxide" refers to a metal oxide comprised of a one or more of the same metal element and oxygen (e.g., $Al_2O_3$, $CeO_2$, $MgO$, $SiO_2$, and $Y_2O_3$);
"complex metal oxide" refers to a metal oxide comprised of two or more different metal elements and oxygen (e.g., $CeAl_{11}O_{18}$, $DyAlO_3$, $MgAl_2O_4$, and $Y_3Al_5O_{12}$);
"complex $Al_2O_3$. metal oxide" refers to a complex metal oxide comprised of, on a theoretical oxide basis, $Al_2O_3$ and one or more metal elements other than Al (e.g., $CeAl_{11}O_{18}$, $DyAlO_3$, $MgAl_2O_4$, and $Y_3Al_5O_{12}$);
"complex $Al_2O_3.Y_2O_3$" refers to a complex metal oxide comprised of, on a theoretical oxide basis, $Al_2O_3$ and $Y_2O_3$ (e.g., $Y_3Al_5O_{12}$);
"complex $Al_2O_3$.rare earth oxide" refers to a complex metal oxide comprised of, on a theoretical oxide basis, $Al_2O_3$ and rare earth oxide (e.g., $CeAl_{11}O_{18}$ and $DyAlO_3$); and
"rare earth oxides" refer to, on a theoretical oxide basis, $CeO_2$, $Dy_2O_3$, $Er_2O_3$, $Eu_2O_3$, $Gd_2O_3$, $Ho_2O_3$, $La_2O_3$, $Lu_2O_3$, $Nd_2O_3$, $Pr_6O_{11}$, $Sm_2O_3$, $Th_4O_7$, $Tm_2O_3$, and $Yb_2O_3$.

In another aspect, the present invention provides a method for making fused, crystalline material according to the present invention, the method comprising:
melting at least one $Al_2O_3$ source and at least one $Y_2O_3$ source to provide a melt, wherein and at least one source of nitrogen (e.g. AlN) or carbon (e.g. $Al_4C_3$) is provided in the melt; and
converting the melt to the fused, crystalline material.

Fused crystalline material according to the present invention can be made, formed as, or converted into fibers or abrasive particles.

DETAILED DESCRIPTION

Fused crystalline material according to the present invention can be made, formed as, or converted into fibers, reinforcing particles, or abrasive particles. The abrasive particles can be used be incorporated into an abrasive article, or in loose form. The fibers are useful, for example, as thermal insulation and reinforcing members in composites (e.g., ceramic, metal, or polymeric matrix composites). The reinforcing particles may be incorporated into an organic polymer (thermosetting or thermoplastic) to modify the properties of the polymer.

In general, fused material according to the present invention can be made by heating the appropriate raw materials sources to form a melt, preferably a homogenous melt, and then rapidly cooling the melt to provide a solidified mass.

More specifically, fused material according to the present invention can be made by charging a furnace with sources of $Al_2O_3$, $Y_2O_3$, metal nitride, metal oxynitride, metal carbide, oxycarbide, and the like (e.g., various combinations of nitrides, carbides, oxynitrides, and oxycarbides can be utilized as source for nitrogen or carbon). Other optional additives (e.g., other metal oxides and processing aids) may be included in the charge. The raw material sources can be added to the furnace, for example, together and melted, or sequentially and melted. In addition, or alternatively, the carbon and/or nitrogen can be introduced (e.g., injected) into a molten $Al_2O_3$ and $Y_2O_3$ (and other optional materials).

For solidified melt material containing complex metal oxide(s), at least a portion of the metal oxide present in the melted metal oxide sources (i.e., the melt) react to form complex metal oxide(s) during formation process of the solidified material. For example, an $Al_2O_3$ source and a $Y_2O_3$ source may react to form $Y_3Al_5O_{12}$ (i.e., $5Al_2O_3 + 3Y_2O_3 \rightarrow 2Y_3Al_5O_{12}$, $YAlO_3$ (i.e., $Al_2O_3 + Y_2O_3 \rightarrow 2YAlO_3$), or $Y_4Al_2O_9$ (i.e., $Al_2O_3 + 2Y_2O_3 \rightarrow Y_4Al_2O_9$).

Depending upon the relative proportions of $Al_2O_3$, $Y_2O_3$, nitrides and/or carbides, the resultant solidified material, may comprise:

(a) at least one of crystalline aluminum carbide, aluminum oxycarbide, aluminum nitride, aluminum oxynitride, or a combination thereof (e.g., aluminum oxycarbonitride)-complex $Al_2O_3$.metal oxide (complex $Al_2O_3$.metal oxide is, for example, $Y_3Al_5O_{12}$) eutectic and at least one of crystalline aluminum oxycarbide, aluminum oxynitride, or a combination thereof (e.g., aluminum oxycarbonitride);

(b) at least one of crystalline aluminum oxycarbide, aluminum oxynitride, or a combination thereof (e.g., aluminum oxycarbonitride)-complex $Al_2O_3$.metal oxide (again complex $Al_2O_3$.metal oxide is, for example, $Y_3Al_5O_{12}$) eutectic; and/or (c) at least one of crystalline aluminum oxycarbide, aluminum oxynitride, or a combination thereof (e.g., aluminum oxycarbonitride)-complex $Al_2O_3$.metal oxide (again complex $Al_2O_3$.metal oxide is, for example, $Y_3Al_5O_{12}$) eutectic and crystalline complex $Al_2O_3$.metal oxide (again, complex $Al_2O_3$.metal oxide is, for example, $Y_3Al_5O_{12}$). In addition to the eutectic, some fused abrasive particles according to the present invention may further comprise, for example, at least one of oxynitride or oxycarbide of at least one metal selected from the group consisting of Ti, Mg, Ca, Sc, Sr, Ba, Zr, B, and combinations thereof. In another aspect, some fused abrasive particles according to the present invention may further comprise, for example, at least one of boride, nitride, oxynitride, carbide, or oxycarbide of at least one of Ti, Mg, Ca, Sc, Sr, Ba, or Zr. In yet another aspect, some fused abrasive particles according to the present invention may further comprise, for example, at least one of boron carbide, boron oxycarbide, boron nitride, or boron oxynitride.

It is understood, however, the particular phases formed are dependent upon several factors including the melt composition and solidification conditions. Typically it is preferred that the composition of the melt and the solidification conditions are such that a large portion of the resulting solidified material is occupied by eutectic (i.e., the formulation of the solidified material corresponds to close to eutectic proportions of the various metal oxide phases that present in the material). Although not wanting to be bound by theory, some metastable conditions during formation of the solidified material may lead to the formation of alternative eutectic. For example, if under normal, stable conditions the eutectic that forms is at least one of aluminum oxycarbide, aluminum oxynitride, or a combination thereof/ $Y_3Al_5O_{12}$, under some metastable conditions at least one of aluminum oxycarbide, aluminum oxynitride, or a combination thereof/$YAlO_3$ eutectic may form in place of, or in addition to at least one of aluminum oxycarbide, aluminum oxynitride, or a combination thereof/$Y_3Al_5O_{12}$ eutectic.

It is also with in the scope of the present invention to substitute a portion of the yttrium and/or aluminum cations in a complex $Al_2O_3$.metal oxide (e.g., complex $Al_2O_3$.$Y_2O_3$ (e.g., yttrium aluminate exhibiting a garnet crystal structure)) with other cations. For example, a portion of the Al cations in a complex $Al_2O_3$.$Y_2O_3$ may be substituted with at least one cation of an element selected from the group consisting of: Cr, Ti, Sc, Fe, Mg, Ca, Si, Co, and combinations thereof. For example, a portion of the Y cations in a complex $Al_2O_3$.$Y_2O_3$ may be substituted with at least one cation of an element selected from the group consisting of: Ce, Dy, Er, Eu, Gd, Ho, La, Lu, Nd, Pr, Sm, Th, Tm, Yb, Fe, Ti, Mn, V, Cr, Co, Ni, Cu, Mg, Ca, Sr, and combinations thereof. Similarly, it is also with in the scope of the present invention to substitute a portion of the aluminum cations in aluminum oxynitrides, oxycarbides, and/or alumina. For example, Cr, Ti, Sc, Fe, Mg, Ca, Si, and Co can substitute for aluminum in aluminum oxynitrides, oxycarbides, and/or alumina structure. The substitution of cations as described above may affect the properties (e.g. hardness, toughness, strength, thermal conductivity, etc.) of the fused material.

Further, other eutectics will be apparent to those skilled in the art after reviewing the present disclosure. For example, phase diagrams depicting various eutectics are known in the art.

Fused material according to the present invention typically is comprised of eutectic colonies. An individual colony contains generally homogeneous microstructural characteristics (e.g., similar size and orientation of crystals of constituent phases within a colony). Typically, impurities, if present, in the fused, crystalline material according to the present invention, tend to segregate to colony boundaries, and may be present alone and/or as reaction products (e.g., as a complex $Al_2O_3$.metal oxide) as crystalline and/or amorphous (glass) phase(s).

In another aspect, the phases making up the eutectic colonies include (a) single crystals of two different metal oxides (e.g., single crystals of each of $Y_3Al_5O_{12}$ and at least one of aluminum oxycarbide, aluminum oxynitride, or a combination thereof), (b) a single crystal of one metal oxide (e.g., single crystal of at least one of aluminum oxycarbide, aluminum oxynitride, or a combination thereof) and a plurality of crystals of a different metal oxide (e.g., polycrystalline $Y_3Al_5O_{12}$), or (c) two different polycrystalline metal oxides (e.g., at least one of polycrystalline aluminum oxycarbide, aluminum oxynitride, or a combination thereof and polycrystalline $Y_3Al_5O_{12}$).

The colonies may be in any of a variety of shapes, typically, ranging from essentially spherical to columnar. The composition, phase, and/or microstructure (e.g., crystallinity (i.e., single crystal or polycrystalline) and crystal size) of each colony may be the same or different. The orientation of the crystals inside the colonies may vary from one colony to another. The phases making up some eutectic colonies may be present in a variety of shapes such as, for example, rod or platelet-like to "chinese script"-like. Such differences between colonies may even be present between adjacent colonies.

The number of colonies, their sizes and compositions are affected, for example, by the melt composition and solidification conditions. Although not wanting to be bound by theory, it is believed that the closer the melt composition is to the exact eutectic composition, the smaller the number of colonies that are formed. In another aspect, however, it is believed that slow, unidirectional solidification of the melt also tends to minimize the number of colonies formed, while multidirectional solidification with relatively higher cooling rates tends to increase the number of colonies formed. The solidification rate (i.e., cooling rate) of the melt and/or multidirectional solidification of the melt tend to affect the type and/or number of microstructural imperfections (e.g., pores) present in the resulting fused material. For example, although not wanting to be bound by theory, relatively rapid solidification (i.e., solidification with relatively high cooling rates) and/or multidirectional solidification tend to lead to an increase in the type and/or number of microstructural imperfections (e.g., pores) present in the resulting fused material. Relatively slow solidification, however, tends to lead to an increase in the size of the colonies, and/or crystals present in the solidified material; although it may be possible through slow and controlled cooling, for example, to eliminate formation of colonies. Hence, in selecting the cooling rate and/or degree of multidirectional solidification, there may be a need to increase or decrease the cooling rate to obtain the optimal balance of desirable and undesirable microstructural characteristics associated with the various cooling rates.

Further, for a given composition, the size of the colonies and phases present within the colonies tends to decrease as the cooling rate of the melt increases. Typically, the eutectic colonies in fused material according to the present invention are, on average, less than 100 micrometers, preferably, less than 50 micrometers, wherein such size for a given colony is the average of the two largest dimensions measured from a polished cross-section of the colony, as viewed with a scanning electron microscope (SEM). Typically, the smallest dimension of the crystalline phases making up the eutectic in a colony, as measured from a polished cross-section of the colony viewed with an SEM, is up to 5 micrometers; preferably, up to 2 micrometers; more preferably, up to 1 micrometer, or even up to 0.25 micrometer. Surprisingly, the size of crystals of phases making up the aluminum oxycarbide and/or oxynitride eutectic in fused material according to the present invention, are less than the size of crystals of phases making a comparable eutectic that does not contain the aluminum oxy-carbide and/or -oxynitride. For example, the size of crystals of phases making up an aluminum oxynitride/yttrium aluminum garnet eutectic are typically smaller than the same alumina/yttrium aluminum garnet eutectic which does not contain the oxynitride phase prepared in the same manner.

Some fused material according to the present invention also include primary crystals of at least one of the metal oxide metal carbide or metal nitride phases making up the eutectic constituent of the material. For example, if the eutectic portion is made up of at least one of aluminum oxycarbide, aluminum oxynitride, or combinations thereof phase(s) and a $Y_3Al_5O_{12}$ phase, the microstructure may also include primary crystals of at least one of aluminum nitride, aluminum oxycarbide, aluminum carbide, aluminum oxynitride, or combinations thereof, which is believed to occur when the composition of the melt from which the material are formed is rich in aluminum containing compounds.

The formation of the primary crystals is believed to result from a deviation from the particular eutectic proportions. The greater the deviation, the larger the overall fraction of primary crystals. The primary crystals may be found in a variety of shapes, typically ranging from rod-like structures to dendritic-like structures. Although not wanting to be bound by theory, it is believed that the presence and/or formation of a primary crystal(s) adjacent to a colony may affect the resulting microstructure of the colony. In some cases it may be advantageous (e.g., for an abrasive particle increased abrading performance) to have primary crystals (e.g., at least one of primary aluminum oxycarbide, aluminum oxynitride, or combinations thereof crystals) present in the fused material. It is also believed, however, for abrasive particles, for example, that the abrading performance of an abrasive particle tends to decrease as the size of the primary crystals increase. It is also within the scope of present invention to obtain a fused material with crystals of $Al_2O_3$ as well as crystals of at least one of carbides or nitrides. Such material is prepared when the reaction between aluminum oxide and non-oxide is retarded.

Further, although not wanting to be bound by theory, it is believed that small additions (e.g., less than 5 percent by weight) of metal oxides other than those making up the eutectic may affect colony boundaries, and in turn affect properties (e.g., hardness and toughness) of the fused material.

Sources of (on a theoretical oxide basis) $Al_2O_3$ for making fused material according to the present invention include those known in the art for making conventional fused alumina and alumina-zirconia material. Commercially available $Al_2O_3$ sources include bauxite (including both natural occurring bauxite and synthetically produced bauxite), calcined bauxite, hydrated aluminas (e.g., boehmite, and gibbsite), Bayer process alumina, aluminum ore, gamma alumina, alpha alumina, aluminum salts, aluminum nitrates, and combinations thereof The $Al_2O_3$ source may contain, or only provide, $Al_2O_3$. Alternatively, the $Al_2O_3$ source may contain, or provide $Al_2O_3$, as well as one or more metal oxides other than $Al_2O_3$ (including materials of or containing complex $Al_2O_3$.metal oxides (e.g., $Y_3Al_5O_{12}$)).

Commercially available sources of (on a theoretical oxide basis) $Y_2O_3$ for making fused material according to the present invention include yttrium oxide A powders, yttrium, yttrium-containing ores, and yttrium salts (e.g., yttrium carbonates, nitrates, chlorides, hydroxides, and combinations thereof). The $Y_2O_3$ source may contain, or only provide, $Y_2O_3$. Alternatively, the $Y_2O_3$ source may contain, or provide $Y_2O_3$, as well as one or more metal oxides other than $Y_2O_3$ (including materials of or containing complex $Y_2O_3$.metal oxides (e.g., $Y_3Al_5O_{12}$)).

Commercially available sources of metal nitrides and metal carbides for making fused material according to the present invention include powders and ores comprised of at least one of metal (e.g., aluminum) carbide or nitride and/or at least one other metal other than Al. Other materials containing carbon (e.g., graphite powder) and/or nitrogen (e.g., nitrogen gas) may also be used as raw materials for making fused material according to the present invention.

Preferred fused material according to the present invention comprise, on a theoretical oxide basis, in the range from about 30% by weight to about 95% by weight $Al_2O_3$ and, on a theoretical oxide basis, in the range from about 70% by weight to about 5% by weight $Y_2O_3$ and at least one of nitrogen or carbon; more preferably, in the range from about 50% by weight to about 90% by weight $Al_2O_3$ and in the range from about 50% by weight to about 10% by weight $Y_2O_3$ and at least one of nitrogen or carbon; and even more preferably, in the range from about 60% by weight to about 85% by weight $Al_2O_3$ and in the range from about 40% by weight to about 15% by weight $Y_2O_3$ and at least one of nitrogen or carbon, based on the total metal oxide, carbide, and nitride content of the eutectic material. Typically, the total nitrogen and carbon content of the eutectic material does not exceed 10% by weight.

Optionally, fused material according to the present invention further comprise other oxide metal oxides (i.e., metal oxides other than at least one of aluminum oxycarbide, aluminum oxynitride, or a combination thereof and $Y_2O_3$). The addition of certain metal oxides may alter the crystalline structure or microstructure of the resulting fused material. For example, although not wishing to be bound by any theory, it is theorized that certain metal oxides or metal oxide containing compounds (even when used in relatively small amounts, for example, even 0.01 to 5 percent by weight, based on the total metal oxide content of the fused material) may be present at the boundaries between the eutectic colonies. The presence of these metal oxides, which may be in the form of reaction products together or with the $Al_2O_3$, $Y_2O_3$, and/or at least one of aluminum oxycarbide, aluminum oxynitride, or a combination thereof may affect the fracture characteristics and/or microstructure of the fused material, and/or may affect the grinding characteristics of the fused material. The optional metal oxides may also act as a processing aid, for example, to increase the density of the fused material, by decreasing the size and/or number of pores in the fused material. The optional metal oxides may also act as a processing aid, for example, to increase or decrease the effective melting temperature of the melt. Thus certain metal oxides may be added for processing reasons.

Fused material according to the present invention typically comprise less than 50 percent by weight (more typically, less than 20 percent by weight; in some cases in the range from 0.01 to 5 percent by weight, in other cases from 0.1 to 1 percent by weight) of metals oxides (on a theoretical oxide basis) other than alumina and yttria, based on the total metal oxide content of the fused material. Sources of the other metal oxides are also readily commercially available.

Examples of optional metal oxides include, on a theoretical oxide basis, rare earth oxides, BaO, CaO, $Cr_2O_3$, CoO, $Fe_2O_3$, $HfO_2$, $Li_2O$, MgO, MnO, NiO, $SiO_2$, $TiO_2$, $Na_2O$, $Sc_2O_3$, SrO, $V_2O_3$, ZnO, $ZrO_2$, and combinations thereof. Further with regard to rare earth oxides, commercially available sources of rare earth oxides for making fused material according to the present invention include rare earth oxide powders, rare earth metals, rare earth-containing ores (e.g., bastnasite and monazite), rare earth salts, rare earth nitrates, and rare earth carbonates. The rare earth oxide(s) source may contain, or only provide, rare earth oxide(s). Alternatively, the rare earth oxide(s) source may contain, or provide rare earth oxide(s), as well as one or more metal oxides other than rare earth oxide(s) (including materials of or containing complex rare earth oxide.other metal oxides (e.g., $DyAlO_3$, $CeAl_{11}O_{18}$, etc.)).

One preferred optional metal oxide is $ZrO_2$. Commercially available sources of (on a theoretical oxide basis) $ZrO_2$ for making fused material according to the present invention include zirconium oxide powders, zircon sand, zirconium, zirconium-containing ores, and zirconium salts (e.g., zirconium carbonates, acetates, nitrates, chlorides, hydroxides, and combinations thereof). In addition, or alternatively, the $ZrO_2$ source may contain, or provide $ZrO_2$, as well as other metal oxides such as hafnia.

Metal oxide sources for making fused material according to the present invention also include fused abrasive particles (e.g., fused alumina abrasive particles) or other fused material (e.g., fused alumina material) having the same composition or different composition(s), which together with remaining metal oxide sources, provide the desired composition of the fused material.

A reducing agent, such as a carbon source may be added to reduce impurities during the melting process. Examples of carbon sources include: coal, graphite, petroleum coke, or the like. Typically, the amount of carbon included in the charge to the furnace is up 5% by weight of the charge; more typically, up to 3% by weight, and more typically, up to 2% by weight. Iron may also be added to the furnace charge to aid in the removal of impurities. The iron can combine with the impurities to make a material that can be removed magnetically, for example, from the melt or crushed solidified material.

The particular selection of metal carbide, nitride, and oxide sources, as well as other additives, for making fused material according to the present invention typically takes into account, for example, the desired composition and microstructure of the resulting fused material, the desired physical properties (e.g., hardness or toughness) of the resulting fused material, avoiding or minimizing the presence of undesirable impurities, the desired characteristics of the resulting fused material, and/or the particular process (including equipment and any purification of the raw materials before and/or during fusion and/or solidification) being used to prepare the fused material.

The metal carbide, nitride, and oxide sources, as well as other additives, can be in any form suitable to the process and equipment being used to make the fused material. The raw materials can be fused using techniques and equipment known in the art for making conventional fused alumina and alumina-zirconia abrasive particles (see, e.g., U.S. Pat. Nos. 3,781,172 (Pett et al.), 3,891,408 (Rowse et al.), 4,035,162 (Brothers et al.), 4,070,796 (Scott), 4,073,096 (Ueltz et al.), 4,126,429 (Watson), 4,457,767 (Poon et al.), 5,143,522 (Gibson et al.), and U.S. Pat. No. Re. 31,128 (Walker et al.), the disclosures of which are incorporated herein by reference).

Examples of furnaces for melting the metal oxide sources and other additives include arc furnaces, pig furnaces, arc tapping furnaces, electric furnaces, electric arc furnaces, and gas fired furnaces. Suitable electric furnaces include those in which the electrodes are arranged to create a "kissing arc", wherein the lower tip of the electrodes are not in contact within the molten mass, as well as those in which the electrodes are submerged in the molten mass to provide resistance heating via current passing through the melt.

The furnace may have a lining (sometimes referred to as a "shell" or "skeleton") that covers the inside of the furnace walls. The lining may be made from a material dissimilar to the desired fused material composition. Typically, however it is preferred that the furnace lining is made from a composition or material similar, sometimes nearly identical or identical to the composition of the fused material. Thus during processing, if the outer (exposed) surface of the lining melts, the potential contamination of the melt is reduced or minimized.

For some metal carbide, nitride, and oxide sources, as well as other additives, it may also be desirable to preheat feed prior to charging it into the furnace, or otherwise combining it with other metal oxide sources and other additives. For example, if carbonate, nitrate or other salts are used as the metal oxide source, it may be desirable to calcine (e.g., by heating them in air at about 400–1000° C.) such materials prior to adding them with the other metal oxide source materials.

Generally, the metal carbide, nitride, and oxide sources, as well as other additives, if present, are heated to a molten state, and mixed until the melt is homogenous. Typically, the melt is heated to and held at a temperature at least 50° C. (preferably, at least 100° C.) above the melting point of the melt. If the temperature of the melt is too low, the viscosity of the melt may be undesirably too high, making it more difficult to homogenize the various metal carbide, nitride, and oxide sources, as well as other additives, making up the melt, or to pour or otherwise transfer the melt from the furnace. If the temperature of the melt is too high temperature, and/or the melt heated for too long, energy will be wasted, and there may be undesirable volatilization of components of the melt as well.

In some cases, it may be desirable, to mix, or otherwise blend the metal carbide, nitride, and oxide sources, as well as other additives (e.g., volatile components (e.g., water or organic solvent) which may assist in forming a homogenous mixture or blend), if present, together prior to forming the melt. For example, particulate metal carbide, nitride, and oxide sources can be milled (e.g., ball milled) to both mix the materials together, as well as reduce the size of the particulate material. Other techniques for mixing or blending the metal carbide, nitride, and oxide sources, as well as other additives, if present, together prior to forming the melt include high shear mixers, paddle mixers, V-blenders, tumblers, and the like. Milling times may range from several minutes to several hours, or even days. Optionally, fugitive materials such as water and organic solvents may be removed from the mixture or blend of metal carbide, nitride, and oxide sources and other additives, for example, by heating, prior to forming the melt. For ease of handling, the metal carbide, nitride, and oxide sources, as well as other additives, may also be agglomerated prior to charging them to the furnace.

The atmosphere over the melt may be at atmospheric pressure, a pressure above atmospheric pressure, or a pressure below atmospheric pressure, although a pressure below atmospheric pressure may be preferred in order to reduce the number of pores in the resulting solidified material. The atmosphere over the melt may also be controlled to provide an oxidizing, reducing, or inert atmosphere which may affect the melt chemistry.

Reducing conditions during melting may aid in purifying the melt. In addition to, or alternatively to, adding a reducing agent to the melt, suitable reducing conditions may be obtained using carbon electrodes with an electric arc melting furnace. Under suitable reducing conditions, some impurities (e.g., silica, iron oxide, and titania) will convert to their respective molten metallic form, leading to a higher specific gravity for the melt. Such free metal(s) impurities would then tend to sink to the bottom of the furnace.

In another aspect, it may be desirable to oxidize free metal present in the melt before the melt is cooled (e.g., before pouring the melt from the furnace). For example, an oxygen lance(s) may be inserted into the melt just prior to pouring the melt from the furnace (see, e.g., U.S. Pat. No. 960,712, the disclosure of which is incorporated herein by reference).

The melt can be cooled using any of a variety of techniques known in the art, depending, for example, on the desired article to be formed. In making abrasive particles, for example, the furnace containing the melt is typically capable of being tilted such that the melt can be poured over or into a heat sink. Examples of heat sinks include metallic balls (e.g., cast iron or carbon steel balls), metallic rods, metallic plates, metallic rolls, and the like. In some instances, these heat sink materials may be internally cooled (e.g., water-cooled or a suitable refrigerant) to achieve fast cooling rates. The heat sink material may also be pieces of pre-fused material (having the same or a different composition being solidified) or other refractory material.

Further with regard to heat sinks useful, for example, in making abrasive particles, the melt can be cooled by pouring the melt over and in between a plurality of metallic balls. The balls typically range in diameter from about 1 to 50 cm, more typically 5 to 25 cm. The melt may also be cooled using book molds. Suitable book molds consist of a plurality of thin plates (e.g., metallic or graphite plates) that are spaced relatively close together. The plates are usually spaced less than 10 cm apart, typically less than 5 cm, and preferably less than 1 cm apart. The melt may also be poured into graphite or cast iron molds to form slabs. It is generally preferred that such "slabs" be relatively thin so as to achieve faster cooling rates.

Fibers or rods comprised of fused according to the present invention can be made from the raw materials using techniques and equipment known in the art for making conventional fused fibers. For example, one method for making such fibers is the Czochralski method, wherein a crystal seed is dipped into a melt pool (similar in composition to a seed crystal) and then drawn out of the melt. A variation of this method, is the Edge-defined Film-fed Growth method, which can be used to grow shaped profiles (e.g. tubes, plates) from a thin film of a melt formed under an action of capillary forces. Fibers or rods of different diameters can also be obtained using the Bridgman-Stockbarger method by melting the desired material in a cylindrical crucible and then withdrawing the crucible from a hot zone while carefully controlling the speed and temperature gradients. Zone melting technique and its variation Laser Heated Float Zone (LHFZ) can be used, for example, to make rods.

The cooling rate is believed to affect the microstructure and physical properties of the solidified material, and thus the fused material. Preferably, the melt is rapidly cooled as the size of the crystalline phases of the solidified material generally decreases as the cooling rate increase. Preferred cooling rates are at least 500° C./min.; more preferably, at least 1000° C./min; and even more preferably, at least 1500° C./min. The cooling rate may depend upon several factors including the chemistry of the melt, the melting point of the melt, the type of heat sink, and the heat sink material.

Rapid cooling may also be conducted under controlled atmospheres, such as a reducing, neutral, or oxidizing environment to maintain and/or influence the desired crystalline phases, oxidation states, etc. during cooling.

Additional details on cooling a melt can be found, for example, in U.S. Pat. No. Re 31,128 (Walker et al.), U.S. Pat. Nos. 3,781,172 (Pett et al.), 4,070,796 (Scott et al.), 4,194,887 (Ueltz et al.), 4,415,510 (Richmond), 4,439,845 (Richmond), 5,027,886 (Strom-Olsen et. al), and 5,143,522 (Gibson et al.), the disclosures of which are incorporated herein by reference.

With regard to making abrasive particles, for example, the resulting (solidified) fused material(s) is typically larger in size than that desired. The fused material can be, and typically is, converted into smaller pieces using crushing and/or comminuting techniques known in the art, including roll crushing, canary milling, jaw crushing, hammer milling, ball milling, jet milling, impact crushing, and the like. In some instances, it is desired to have two or multiple crushing steps. For example, after the molten material is solidified, it may be in the form of a relatively large mass structure (e.g., a diameter greater than 5 cm. The first crushing step may involve crushing these relatively large masses or "chunks" to form smaller pieces. This crushing of these chunks may be accomplished with a hammer mill, impact crusher or jaw crusher. These smaller pieces may then be subsequently crushed to produce the desired particle size distribution. In order to produce the desired particle size distribution (sometimes referred to as grit size or grade), it may be necessary to perform multiple crushing steps. In general the crushing conditions are optimized to achieve the desired particle shape(s) and particle size distribution.

The shape of fused abrasive particles can depend, for example, on the composition and/or microstructure of the abrasive particles, the geometry in which it was cooled, and the manner in which the solidified material is crushed (i.e., the crushing technique used). In general, where a "blocky" shape is preferred, more energy may be employed to achieve this shape. Conversely, where a "sharp" shape is preferred, less energy may be employed to achieve this shape. The crushing technique may also be changed to achieve different desired shapes. Alternatively, abrasive particles may be directly formed into desired shapes by pouring or forming the melt into a mold.

Fused material according to the present invention can be in the form of particles and/or fibers suitable for use as reinforcing materials in composites (e.g., ceramic, metal, or polymeric (thermosetting or thermoplastic). The particles and/or fibers may, for example, increase the modulus, heat resistance, wear resistance, and/or strength of the matrix material. Although the size, shape, and amount of the particles and/or fibers used to make a composite may depend, for example, on the particular matrix material and use of the composite, the size of the reinforcing particles typically range about 0.1 to 1500 micrometers, more typically 1 to 500 micrometers, and preferably between 2 to 100 micrometers. The amount of particles for polymeric applications is typically about 0.5% to about 75% by weight, more typically about 1 to about 50% by weight. Examples of thermosetting polymers include: phenolic, melamine, urea formaldehyde, acrylate, epoxy, urethane polymers, and the like. Examples of thermoplastic polymers include: nylon, polyethylene, polypropylene, polyurethane, polyester, polyamides, and the like.

Examples of uses for reinforced polymeric materials (i.e., reinforcing particles according to the present invention dispersed in a polymer) include protective coatings, for example, for concrete, furniture, floors, roadways, wood, wood-like materials, ceramics, and the like, as well as, anti-skid coatings and injection molded plastic parts and components.

Typically, and preferably, the true density, sometimes referred to as specific gravity, of fused material according to the present invention is typically at least 80% of theoretical density. More preferably, the true density of fused material according to the present invention is at least 85% of theoretical density, even more preferably at least 90% of theoretical density, or even more preferably at least 95% of theoretical density.

Typically, fused material according to the present invention have an average hardness (i.e., resistance to deformation; also referred to as ("microhardness") of at least 11 GPa; preferably, at least 12, 13, or 14 GPa, more preferably, at least 15 GPa, and even more preferably, at least 16 GPa, at least 17 GPa, or even at least 18 GPa. In another aspect, fused material according to the present invention typically have an average toughness (i.e., resistance to fracture) of at least 2.0 MPa m$^{1/2}$; preferably at least 2.5 MPa m$^{1/2}$, more preferably at least 3.0 MPa m$^{1/2}$, and even more preferably, at least 3.3 MPa m$^{1/2}$, at least 3.5 MPa m$^{1/2}$, or even at least 3.8 MPa m$^{1/2}$.

Other suitable preparation techniques for making fused material according to the present invention may be apparent to those skilled in the art after reviewing the disclosure herein, as well as, for example, applications having U.S. Ser. Nos. 09,495,978, 09/496,422, 09/496,638, and 09/496,713, each filed on Feb. 2, 2000, and Ser. Nos. 09/618,876, 09/618,879, 09/619,106, 09/619,191, 09/619,192, 09/619,289, 09/619,563, 09/619,729, 09/619,744, and 09/620,262 each filed on the same date as the instant application, the disclosure of which are all incorporated herein by reference.

Preferred fused material according to the present invention are thermally stable at elevated temperatures, as compared to conventional fused alumina-zirconia materials (including alumina-zirconia abrasive particles available from Norton Company, Worcester, Mass. under the trade designation "NORZON"). When alumina-zirconia eutectic abrasive particles available from Norton Company, Worcester, Mass. under the trade designation "NORZON, are heated in air, for example, to at least about 350° C., typically at least a portion of the zirconia undergoes a tetragonal and/or cubic to monoclinic phase transformation. This phase transformation is usually detrimental to the structural integrity of the alumina-zirconia material because it involves volume changes to the zirconia crystalline phases. Further, such phase transformations have been observed to occur preferentially at the boundaries of eutectic colonies, which thereby tend to weaken the boundaries, and which in turn tend to lead to significant degradation of mechanical properties (i.e., hardness, strength, etc.) of the material. In addition, various impurities, which are typically segregated during solidification of the melt into the eutectic colonies boundaries may also undergo volumetric structural changes (e.g., due to oxidation), leading to further degradation of mechanical properties (i.e., hardness, strength, etc.) of the material.

By contrast, it is believed that preferred fused material according to the present invention typically do not exhibit phase transformations of the eutectic phases when heated up to 1000° C. (in some cases even up to 1400° C.) in air, and thus are thermally stable.

The thermal stability of certain preferred fused material according to the present invention may be measured or illustrated using a variety of different techniques, including: Differential Thermal Analysis (DTA), Thermogravimetric Analysis (TGA), X-ray diffraction, hardness measurements, microstructure analysis, color change, and interaction with glass bonds. The thermal stability of the fused material may be dependent, for example, upon the composition, particle chemistry, and processing conditions.

In one test for measuring the thermal stability of fused material, the average hardness of the fused material is measured before and after being heated in air at 1000° C. in air for 4 hours (see Example 1 (below) for a more complete description of the test). Although there may be some degradation of the average microhardness after being heated for 4 hours in air at 1000° C., the average hardness of preferred fused material according to the present invention after being heated for 4 hours in air at 1000° C. are at least 85%, (preferably at least 90%, more preferably at least 95%, and even more preferably, about 100% or more) of the average microhardness of the fused material prior to such heating.

The thermal stability of fused material may also be observed using Scanning Electron Microscopy (SEM), wherein the average microstructure (e.g., porosity, crystal structure, colony size and crystal size (eutectic crystals, and primary crystals, if present) and integrity of the fused material is examined before and after being heated at 1000° C. in air for 4 hours.

Further, the thermal stability of fused material may also be illustrated by comparing the color of the fused material before and after they are heated at 1000° C. in air for 4 hours. The microstructure of certain preferred fused material according to the present invention is essentially the same before and after being heated at 1000° C. in air for 4 hours.

The thermal stability of fused material may also be illustrated by comparing powder XRD result of the fused material before and after they are heated at 1000° C. in air for 4 hours. As discussed above, when alumina-zirconia eutectic material is heated in air, typically at least a portion of the zirconia undergoes a tetragonal and/or cubic to monoclinic phase transformation. The effect of this phase transformation is typically significant enough to be observed via powder XRD. By contrast, the eutectic phases of certain preferred fused material according to the present invention do not exhibit such phase transformations when heated to 1000° C. in air, hence no such transformation of the eutectic phases will be observed in the XRD results.

Fused material according to the present invention can be used in conventional abrasive products, such as coated abrasive products, bonded abrasive products (including vitrified, resinoid, and metal bonded grinding wheels, cutoff wheels, mounted points, and honing stones), nonwoven abrasive products, and abrasive brushes. Typically, abrasive products (i.e., abrasive articles) include binder and abrasive particles, at least a portion of which is fused abrasive particles according to the present invention, secured within the abrasive product by the binder. Methods of making such abrasive products and using abrasive products are well known to those skilled in the art (see, e.g., U.S. Pat. Nos. 5,427,595 (Pihl et al.), 5,443,906 (Pihl et al.), 5,679,067 (Johnson et al.), 5,903,951 (Ionta et al.) 4,588,419 (Caul et al.), 4,751,137 (Tumey et al.), 5,436,063 (Follett et al.), 4,314,827 (Leitheiser et al.), 4,518,397 (Leitheiser et al.), 4,623,364 (Cottringer et al.), 4,744,802 (Schwabel), 4,770,671 (Monroe et al.), 4,881,951 (Wood et al.), 5,011,508 (Wald et al.), 5,090,968 (Pellow), 5,139,978 (Wood), 5,201,916 (Berg et al.), 5,227,104 (Bauer), 5,366,523 (Rowenhorst et al.), 5,429,647 (Larmie), 5,498,269 (Larmie), 5,551,963 (Larmie), 4,311,489 (Kressner), 4,652,275 (Bloecher et al.), 4,799,939 (Bloecher et al.), 5,549,962 (Holmes et al.), and 5,975,988 (Christianson), 4,734,104 (Broberg), 4,737,163 (Larkey), 5,203,884 (Buchanan et al.), 5,152,917 (Pieper et al.), 5,378,251 (Culler et al.), 5,417,726 (Stout et al.), 5,436,063 (Follett et al.), 5,496,386 (Broberg et al.), 5,609,706 (Benedict et al.), 5,520,711 (Helmin), 5,954,844 (Law et al.), 5,961,674 (Gagliardi et al.), 4,543,107 (Rue), 4,741,743 (Narayanan et al.), 4,800,685 (Haynes et al.), 4,898,597 (Hay et al.), 4,997,461 (Markhoff-Matheny et al.), 5,038,453 (Narayanan et al.), 5,110,332 (Narayanan et al.), 5,863,308 (Qi et al.), 5,094,672 (Giles et al.), 5,118,326 (Sheldon et al.), 5,131,926 (Sheldon et al.), 5,203,886 (Sheldon et al.), 5,282,875 (Wood et al.), 5,738,696 (Wu et al.), 5,863,308 (Qi), and 2,958,593 (Hoover et al.), the disclosure of which is incorporated herein by reference). Furthermore, fused abrasive particles according to the present invention can be used in abrasive applications that utilize loose abrasive particles, such as slurries of abrading compounds (e.g., polishing compounds), milling media, shot blast media, vibratory mill media, and the like.

EXAMPLES

This invention is further illustrated by the following examples, but the particular materials and amounts thereof recited in these examples, as well as other conditions and details, should not be construed to unduly limit this invention. Various modifications and alterations of the present invention will become apparent to those skilled in the art. All parts and percentages are by weight unless otherwise indicated.

Example 1

A polyethylene bottle was charged with 191.8 grams of alumina powder (obtained under the trade designation "APA-0.5" from Condea Vista, Tucson, Ariz.), 93.2 grams of yttrium oxide powder (obtained from H. C. Starck, Newton, Mass.), 15 grams of aluminum nitride powder (Type F; obtained from Tokuyama Soda Co., Japan), and 150 grams of isopropyl alcohol. About 450 grams of alumina milling media (10 mm diameter; 99.9% alumina; obtained from Union Process, Akron, Ohio) were added to the bottle, and the mixture was milled for 4 hours to thoroughly mix the ingredients. After the milling, the milling media were removed and the slurry was poured onto a glass ("PYREX") pan where it was dried using a heat-gun held approximately 46 cm (18 inches) above the pan. The pan was slowly oscillated while drying to prevent the settling of the powder prior to complete drying. After drying with the heat-gun, the pan was placed in a drying oven for an additional 30 minutes at 90° C. to more completely dry the material. The dried powder bed was then scored with a spatula and scraped from the pan to form small flakes of material. Each flake weighed about 0.5 to 3 grams. The flakes were calcined in air by heating them to 670° C. at rate of about 1° C./min, and then holding them at 670° C. for 1 hour, after which the power to the furnace power was shut-off, and the furnace allowed to cool back to room temperature.

Several of the calcined flakes were melted in an arc discharge furnace (Model No. 1-VAMF-20-22-45; from Advanced Vacuum Systems, Ayer, Mass.). About 15 grams of the calcined flakes were placed on the chilled copper plate located inside a furnace chamber. The furnace chamber was evacuated and then backfilled with Argon gas at a 260 torr pressure. An arc was struck between an electrode and a plate. The temperatures generated by the arc discharge were high enough to quickly melt the calcined flakes. After melting was complete, the material was maintained in a molten state for about 30 seconds to homogenize the melt. The resultant melt was rapidly cooled by shutting off the arc and allowing the melt to cool on its own. Rapid cooling was ensured by small mass of a sample and a large heat sinking capability of a chilled copper plate. The fused material was removed from the furnace within one minute after the power to the furnace was turned off. Although not wanting to be bound by theory, it is estimated that the cooling rate of the melt on the surface of the water chilled copper plate was 1500° C./min. The fused material was dark gray in color.

Figure 1:
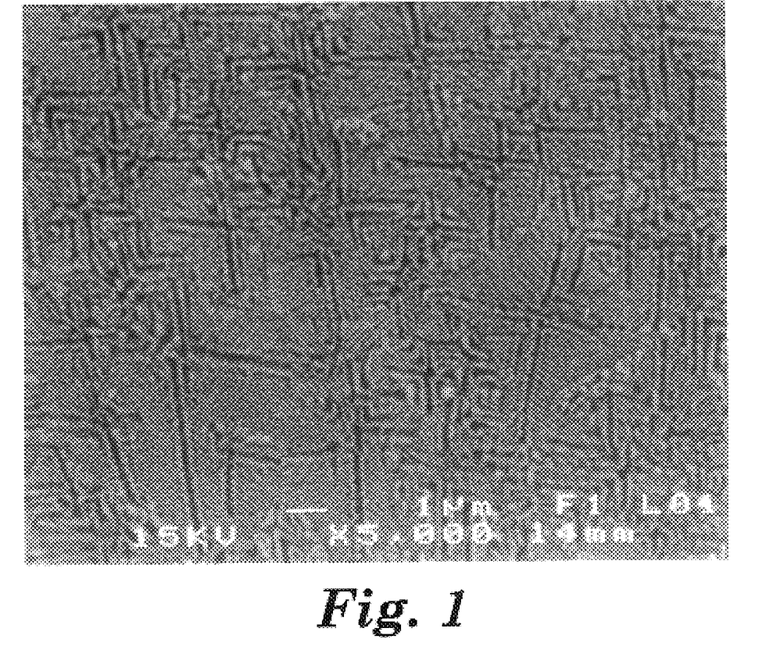
FIG. 1 is a scanning electron micrographs of a polished cross-section of Example 1 fused material.

FIG. 1 is a scanning electron microscope (SEM) photomicrograph of a polished section of fused Example 1 material. The polished section was prepared using conventional mounting and polishing techniques. Polishing was done using a polisher (obtained from Buehler of Lake Bluff, Ill. under the trade designation "ECOMET 3 TYPE POLISHER-GRINDER"). The sample was polished for about 3 minutes with a diamond wheel, followed by three minutes of polishing with each of 45, 30, 15, 9, and 3 micrometer diamond slurries. The polished sample was coated with a thin layer of gold-palladium and viewed using JEOL SEM (Model JSM 840A). Referring again to FIG. 1, the photomicrograph shows a eutectic-derived microstructure comprising a plurality of colonies. The colonies were about 5–25 micrometers in size. The orientation and morphology of crystals making up the colonies varied from one colony to another. Based on powder x-ray diffraction of a portion of Example 1 material, and examination of the polished sample using SEM in the backscattered mode, it is believed that the white portions in the photomicrograph were crystalline $Y_3Al_5O_{12}$, and the dark portions $Al_3O_3N$. The widths of these phases observed in the polished section were up to about 1 micrometer.

Example 1 fused material was crushed by using a "Chipmunk" jaw crusher (Type VD, manufactured by BICO Inc., Burbank, Calif.) into (abrasive) particles and graded to retain the −25+30 and −30+35 mesh fractions (USA Standard Testing Sieves). These two mesh fractions were combined to provide a 50/50 blend. Thirty grams of the 50/50 blend of −25+30 and −30+35 mesh fractions were incorporated into a coated abrasive disc. The coated abrasive disc was made according to conventional procedures. The fused abrasive particles were bonded to 17.8 cm diameter, 0.8 mm thick vulcanized fiber backings (having a 2.2 cm diameter center hole) using a conventional calcium carbonate-filled phenolic make resin (48% resole phenolic resin, 52% calcium carbonate, diluted to 81% solids with water and glycol ether) and a conventional cryolite-filled phenolic size resin (32% resole phenolic resin, 2% iron oxide, 66% cryolite, diluted to 78% solids with water and glycol ether). The wet make resin weight was about 185 g/m². Immediately after the make coat was applied, the fused abrasive particles were electrostatically coated. The make resin was precured for 120 minutes at 88° C. Then the cryolite-filled phenolic size coat was coated over the make coat and abrasive particles. The wet size weight was about 850 g/m². The size resin was cured for 12 hours at 99° C. The coated abrasive disc was flexed prior to testing.

The average microhardnesses of Example 1 abrasive particles were measured by mounting loose abrasive particles (about 10 mesh in size) in mounting resin (obtained under the trade designation "EPOMET" from Buehler Ltd., Lake Bluff, Ill.). The resulting cylinder of resin was about 2.5 cm (1 inch) in diameter and about 1.9 cm (0.75 inch) tall. The mounted samples were polished using a conventional grinder/polisher (obtained under the trade designation "EPOMET" from Buehler Ltd.) and conventional diamond slurries with the final polishing step using a 1 micrometer diamond slurry (obtained under the trade designation "METADI" from Buehler Ltd.) to obtain polished cross-sections of the sample.

The microhardness measurements were made using a conventional microhardness tester (obtained under the trade designation "MITUTOYO MVK-VL" from Mitutoyo Corporation, Tokyo, Japan) fitted with a Vickers indenter using a 500-gram indent load. The microhardness measurements were made according to the guidelines stated in ASTM Test Method E384 Test Methods for Microhardness of Materials (1991), the disclosure of which is incorporated herein by reference. The microhardness values were an average of 20 measurements. The average microhardness was 16.2 GPa.

Several Example 1 abrasive particles were heated placed in a platinum crucible and heated to 1000° C. at 50° C./hour, held at 1000° C. for 4 hours (in air), and then cooled to room temperature at about 100° C./hour. The color of the abrasive particles after heating was the same as before heating (i.e., dark gray). The average microhardness of the abrasive particles after heating was 16.1 GPa. The polished cross-sections prepared for the microhardness measurements were examined using the SEM in the secondary electron mode. The microstructure observed after heating was substantially the same as the microstructure observed before heating.

Several Example 1 abrasive particles were also heated placed in a platinum crucible and heated to 1000° C. at 50° C./hour, held at 1000° C. for 8 hours (in air), and then cooled to room temperature at about 100° C./hour. The color of the abrasive particles after heating was the same as before heating (i.e., dark gray). The average microhardness of the abrasive particles after heating was 15.8 GPa. The polished cross-sections prepared for the microhardness measurements were examined using the SEM in the secondary electron mode. The microstructure observed after heating was substantially the same as the microstructure observed before heating.

Comparative Example A

The Comparative Example A coated abrasive disc was prepared as described in Example 1 except heat-treated fused alumina abrasive particles (obtained under the trade designation "ALODUR BFRPL" from Triebacher, Villach, Austria) was used in place of the Example 1 fused abrasive particles.

Comparative Example B

The Comparative Example B coated abrasive disc was prepared as described in Example 1 except alumina-zirconia abrasive particles (having a eutectic composition of 53% $Al_2O_3$ and 47% $ZrO_2$; obtained under the trade designation "NORZON" from Norton Company, Worcester, Mass.) was used in place of the Example 1 fused abrasive particles.

The average microhardness of Comparative Example B abrasive particles was determined, as described above in Example 1, to be 16.0 GPa. The color of the Comparative Example B abrasive particles was gray-navy blue.

Figure 2:
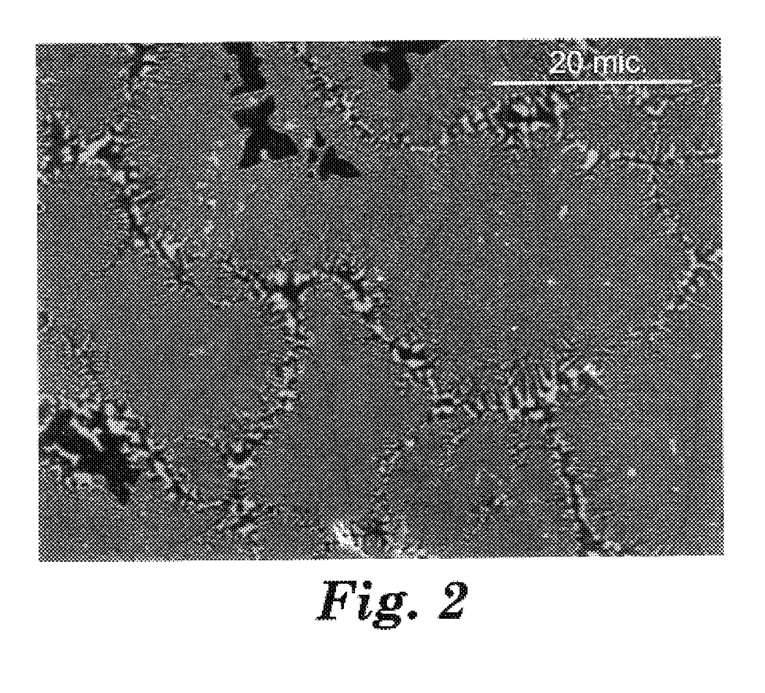
FIG. 2 is a scanning electron micrographs of a polished cross-section of Comparative Example B abrasive particles.
Figure 3:
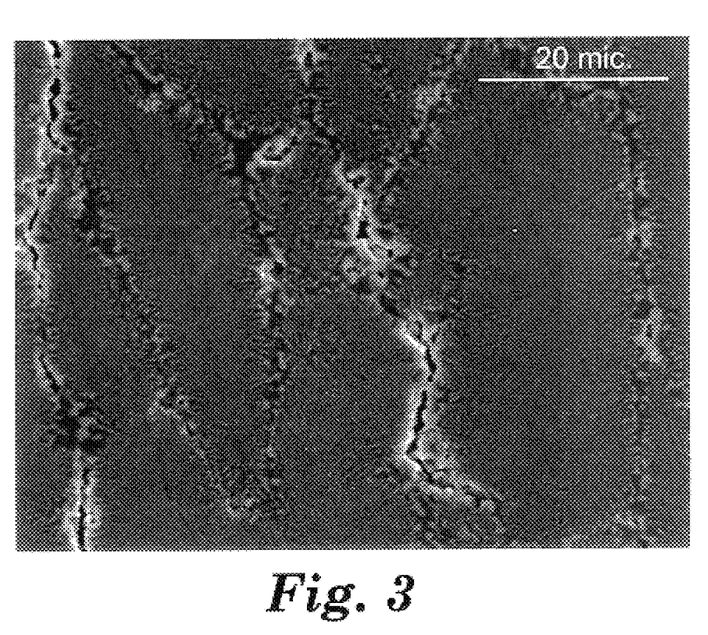
FIGS. 3–5 are scanning electron photomicrographs of polished cross-sections of Comparative Example B abrasive particles after exposure to various heating conditions.

Several Comparative Example B abrasive particles were heated placed in a platinum crucible and heated to 1000° C. at 50° C./hour, held at 1000° C. for 4 hours (in air), and then cooled to room temperature at about 100° C./hour. The color of the abrasive particles after heating was beige. The average microhardness of the abrasive particles after heating was 12.9 GPa. The polished cross-sections prepared for the microhardness measurements were examined using the SEM in the secondary electron mode. An SEM photomicrograph a Comparative Example B abrasive particle before heating is shown in FIG. 2. An SEM photomicrograph a Comparative Example B abrasive particle after heating is shown in FIG. 3. The microstructure observed after heating was different than that observed before heating. The differences were observed most predominately at the colony boundaries.

Further powder x-ray diffraction (using a Phillips XRG 3100 x-ray diffractometer with copper K α1 radiation of 1.54050 Angstrom) was used to qualitatively measure the phases present in Comparative Example B abrasive particles before and after the above described heat-treatment by comparing the peak intensities of 111 of cubic and/or tetragonal reflection at about 2θ=30 degrees, to that of 11$\overline{1}$ of monoclinic reflection at about 2θ=28 degrees. For reference see "Phase Analysis in Zirconia Systems," Garvie, R. C. and Nicholson, P. S., Journal of the American Ceramic Society, vol 55 (6), pp. 303–305, 1972, the disclosure of which is incorporated herein by reference. The samples were ground and −120 mesh powders used for analysis. The unheat-treated Comparative Example B abrasive particles contained both the monoclinic and cubic and/or tetragonal zirconia phases. For the heat-treated sample, a decrease in the cubic and/or tetragonal phase content with a corresponding increase in monoclinic phase content was observed.

Figure 4:
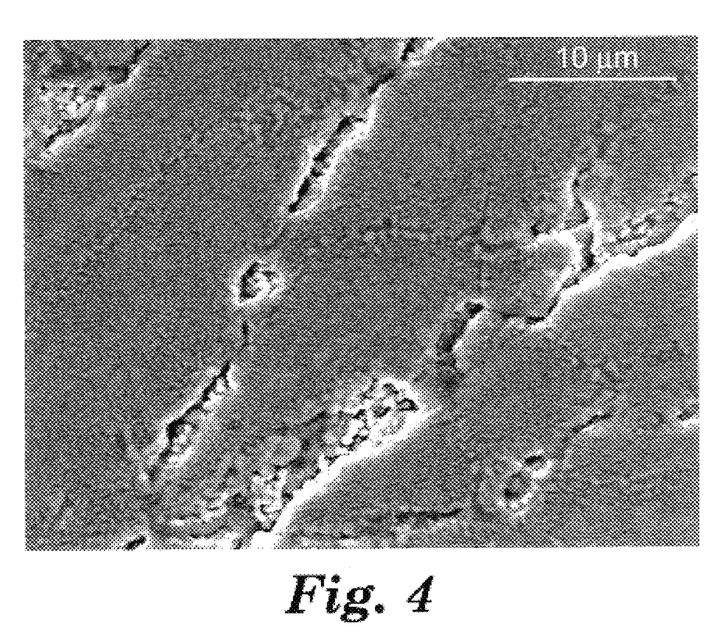

Several Comparative Example B abrasive particles were heated placed in a platinum crucible and heated to 1000° C. at 50° C./hour, held at 1000° C. for 8 hours (in air), and then cooled to room temperature at about 100° C./hour. The color of the abrasive particles after heating was beige. The average microhardness of the abrasive particles after heating was 12.8 GPa. The polished cross-sections prepared for the microhardness measurements were examined using the SEM in the secondary electron mode. An SEM photomicrograph a Comparative Example B abrasive particle after heating is shown in FIG. 4. The microstructure observed after heating was different than that observed before heating. The differences, which were greater than those observed for the heat-treatment at 1000° C. for 4 hours, were again observed most predominately at the colony boundaries.

Figure 5:
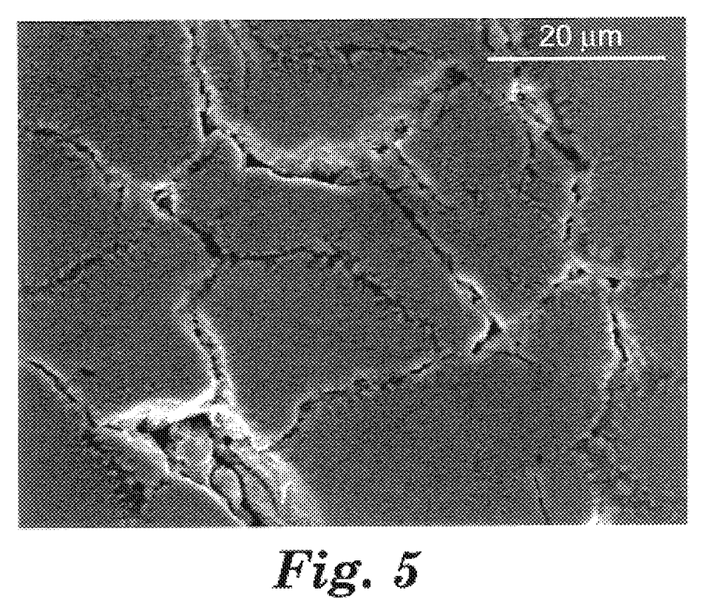

The effect of two vitrified bonding materials on Comparative Example B abrasive particles were evaluated as follows. A first vitrified bond material was prepared by charging a plastic jar (4⅜ inches (11.1 cm) in diameter; 4⅜ inches (11.1 cm) in height) with 70 parts of a glass frit (37.9% $SiO_2$, 28.5% $B_2O_3$, 15.6% $Al_2O_3$, 13.9% $Na_2O$, and 4.1% $K_2O$; obtained under the trade designation "FERRO FRIT 3227" from Ferro Corporation, Cleveland, Ohio), 27 parts of Kentucky Ball Clay (No 6DC; obtained from Old Hickory Clay Company, Hickory, Ky.), 3.5 parts of $Li_2CO_3$ (obtained from Alfa Aesar Chemical Company, Ward Hill, Mass.), 3 parts $CaSiO_3$ (obtained from Alfa Aesar Chemical Company), and 625 grams of 1.3 cm (0.5 inch) diameter plastic coated steel media, and then dry milling the contents at 90 rpm for 7 hours. The composition was formulated to provide a vitrified bond material comprising about 45% $SiO_2$, about 19% $Al_2O_3$, about 20% $B_2O_3$, about 10% $Na_2O$, about 3% $K_2O$, about 1.5% $Li_2O$, and about 1.5% CaO. The dry milled material and Comparative Example B abrasive particles were pressed into a 3.2 cm×0.6 cm (1.25 inch×0.25 inch) pellet. The pellet was heated to 1000° C. at 50° C./hour, held at 1000° C. for 8 hours (in air), and then cooled to room temperature at about 100° C./hour. The pellet was prepared by mixing, in order, 20 parts of Comparative Example B abrasive particles (−20+30 mesh), 0.24 part of hydrolyzed starch (obtained under the trade designation "DEXTRIN" from Aldrich Chemical Company, Milwaukee, Wis.), 0.02 part glycerine (obtained from Aldrich Chemical Company), 0.72 part water, 3.14 parts of the dry milled material, and 0.4 part of hydrolyzed starch ("DEXTRIN"). The pellet was pressed under a load of 2273 kilograms (5000 lbs.). The average microhardness of the abrasive particles after heating in the vitrified bonding material was 13.6 GPa, although some of the Comparative Example B abrasive particles exhibit such severe degradation that microhardness measurements could not be effectively made (portions of the particles were too weak). There was variability in the color of the heat-treated abrasive particles, although the majority of the particles were beige. The polished cross-sections prepared for the microhardness measurements were examined using the SEM in the secondary electron mode. An SEM photomicrograph a Comparative Example B abrasive particle after heating is shown in FIG. 5. The microstructure observed after heating was different than that observed before heating. The differences, which were greater than those observed for the heat-treatment at 1000° C. for 4 hours, were again observed most predominately at the colony boundaries.

A second vitrified bond material was prepared by charging a plastic jar (4⅜ inches (11.1 cm) in diameter; 4⅜ inches (11.1 cm) in height) with 45 parts of Kentucky Ball Clay (No. 6DC; obtained from Old Hickory Clay Company), 28 parts of anhydrous sodium tetraborate (obtained from Alfa Aesar Chemical Company), 25 parts of feldspar (obtained under the trade designation "G-200 Feldspar" from Feldspar Corporation, Atlanta, Ga.), 3.5 parts of $Li_2CO_3$ (obtained from Alfa Aesar Chemical Company), 2.5 parts of $CaSiO_3$ (obtained from Alfa Aesar Chemical Company), and 625 grams of 1.3 cm (0.5 inch) diameter plastic coated steel media, and then dry milling the contents at 90 rpm for 7 hours. The composition was formulated to provide a vitrified bond material comprising about 45% $SiO_2$, about 19% $Al_2O_3$, about 20% $B_2O_3$, about 10% $Na_2O$, about 3% $K_2O$, about 1.5% $Li_2O$, and about 1.5% CaO. The dry milled material and Comparative Example B abrasive particles were pressed into a 3.2 cm×0.6 cm (1.25 inch×0.25 inch) pellet. The pellet was heated to 1000° C. at 50° C./hour, held at 1000° C. for 8 hours (in air), and then cooled to room temperature at about 100° C./hour. The pellet was prepared by mixing, in order, 20 parts of Comparative Example B abrasive particles (−20+30 mesh), 0.24 part of hydrolyzed starch ("DEXTRIN"), 0.02 part glycerine (obtained from Aldrich Chemical Company), 0.72 part water, 3.14 parts of the dry milled material, and 0.4 part of hydrolyzed starch ("DEXTRIN"). The pellet was pressed under a load of 2273 kilograms (5000 lbs.). The average microhardness of the abrasive particles after heating in the vitrified bonding material was 13.4 GPa, although some of the Comparative Example B abrasive particles exhibit such severe degradation that micorhardness measurements could not be effectively made (portions of the particles were too weak). There was variability in the color of the heat-treated abrasive particles, although the majority of the particles were beige. The polished cross-sections prepared for the microhardness measurements were examined using the SEM in the secondary electron mode. The microstructure observed after heating was different than that observed before heating. The differences, which were greater than those observed for the heat-treatment at 1000° C. for 4 hours, were again observed most predominately at the colony boundaries.

Comparative Example C

The Comparative Example C coated abrasive disc was prepared as described in Example 1 except sol-gel-derived abrasive particles (commercially available under the trade designation "321 CUBITRON" from the 3M Company, St. Paul, Minn.) was used in place of the Example 1 fused abrasive particles.

Grinding Performance of Example 1 and Comparative Examples A–C

The grinding performance of Example 1 and Comparative Examples A–C coated abrasive discs were evaluated as follows. Each coated abrasive disc was mounted on a beveled aluminum back-up pad, and used to grind the face of a pre-weighed 1.25 cm×18 cm×10 cm 1018 mild steel workpiece. The disc was driven at 5,000 rpm while the portion of the disc overlaying the beveled edge of the back-up pad contacted the workpiece at a load of 8.6 kilograms. Each disc was used to grind individual workpiece in sequence for one-minute intervals. The total cut was the sum of the amount of material removed from the workpieces throughout the test period. The total cut by each sample after 12 minutes of grinding as well as the cut at 12th minute (i.e., the final cut) are reported in Table 1, below.

TABLE 1

| Example | Total cut, g | Final cut, g |
| --- | --- | --- |
| Comp. A | 414 | 24 |
| Comp. B | 637 | 50 |
| Comp. C | 988 | 90 |
| 1 | 885 | 69 |

Example 2

Example 2 fused material was prepared as described in Example 1, except the polyethylene bottle was charged with 199.9 grams of alumina powder ("APA-0.5"), 97.1 grams of yttrium oxide powder (obtained from H. C. Starck), 3 grams of aluminum nitride powder (Type F), and 150 grams of isopropyl alcohol.

Figure 6:
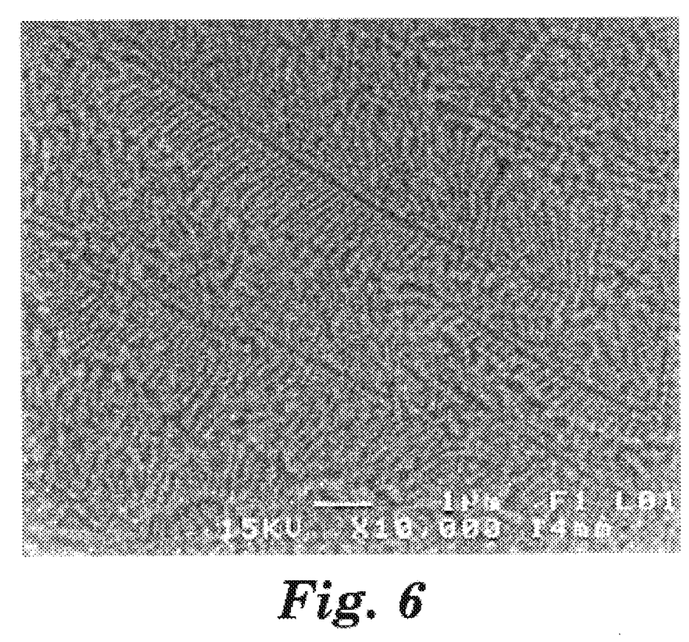
FIGS. 6–8 are scanning electron micrographs of a polished cross-section of Examples 2, 3 and 4 fused material, respectively.

FIG. 6 is an SEM photomicrograph of a polished section (prepared as described in Example 1) of fused Example 2 material. Referring to FIG. 6, the photomicrograph shows a eutectic-derived microstructure comprising a plurality of colonies. The colonies were about 5–30 micrometers in size. The orientation and morphology of crystals making up the colonies varied from one colony to another. Based on powder x-ray diffraction of a portion of Example 2 material, and examination of the polished sample using SEM in the backscattered mode, it is believed that the white portions in the photomicrograph were crystalline $Y_3Al_5O_{12}$, and the dark portions $Al_2O_3$ and $Al_3O_3N$ (material was found to contain both of these phases). The widths of these phases observed in the polished section were up to about 3 micrometers.

Example 3

Example 3 fused material was prepared as described in Example 1, except the polyethylene bottle was charged with 171.6 grams of alumina powder ("APA-0.5"), 83.4 grams of yttrium oxide powder (obtained from H. C. Starck), 45 grams of aluminum nitride powder (Type F), and 150 grams of isopropyl alcohol.

Figure 7:
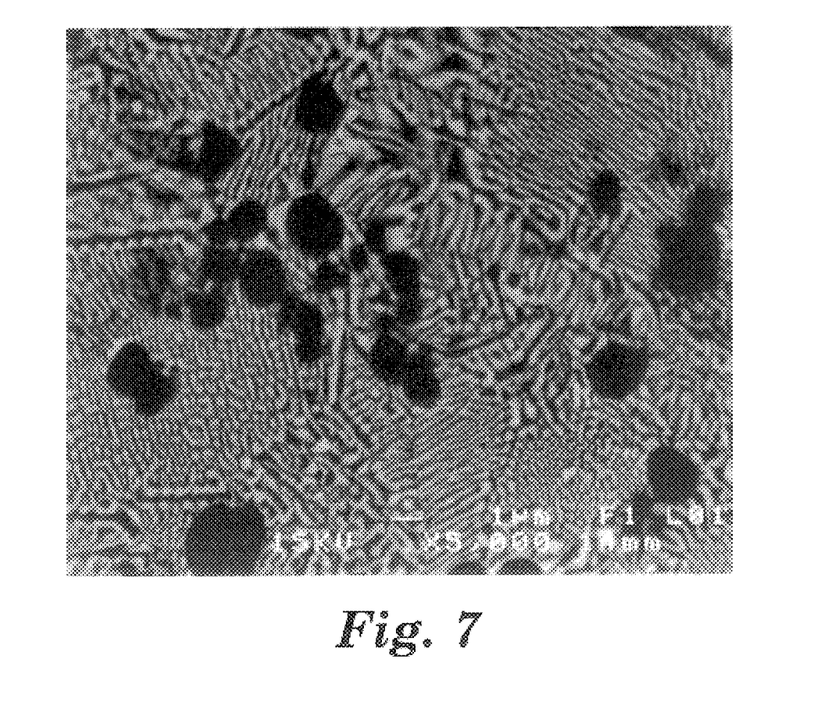

FIG. 7 is an SEM photomicrograph of a polished section (prepared as described in Example 1) of fused Example 3 material. Referring to FIG. 7, the photomicrograph shows a eutectic-derived microstructure comprising a plurality of colonies. The colonies were about 5–30 micrometers in size. The orientation and morphology of crystals making up the colonies varied from one colony to another. FIG. 7 also shows the presence of a third phase in the form of largely spherical inclusions. Based on powder x-ray diffraction of a portion of Example 3 material, and examination of the polished sample using SEM in the backscattered mode, it is believed that the white portions in the photomicrograph were crystalline $Y_3Al_5O_{12}$, and the dark portions $Al_3O_3N$. The dark inclusions are believed to be AlN phase. The widths of crystals of $Y_3Al_5O_{12}$ and $Al_3O_3N$ phases observed in the polished section were up to about 3 micrometers.

Example 4

Example 4 fused material was prepared as described in Example 1, except the polyethylene bottle was charged with 181.7 grams of alumina powder ("APA-0.5"), 88.3 grams of yttrium oxide powder (obtained from Alfa Aesar A Johnson Matthey Company, Ward Hill, Mass.), 30 grams of aluminum carbide powder (obtained from Aldrich Chemical, Milwaukee, Wis.), and 150 grams of isopropyl alcohol.

Figure 8:
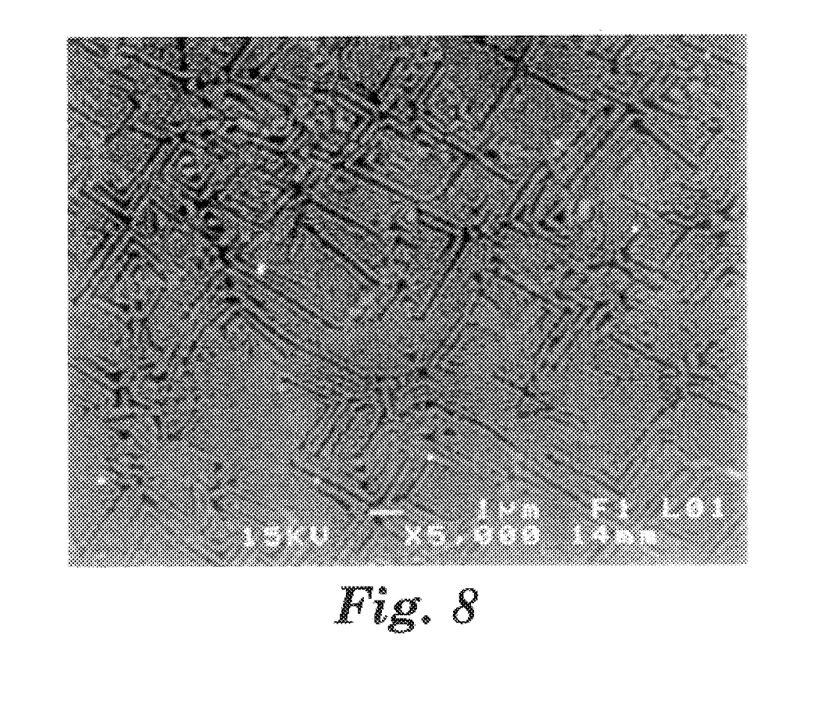

FIG. 8 is an SEM photomicrograph of a polished section (prepared as described in Example 1) of fused Example 4 material. Referring to FIG. 8, the photomicrograph shows a eutectic-derived microstructure comprising a plurality of colonies. The colonies were about 5–30 micrometers in size. The orientation and morphology of crystals making up the colonies varied from one colony to another. Based on powder x-ray diffraction of a portion of Example 4 material, and examination of the polished sample using SEM in the backscattered mode, it is believed that the white portions in the photomicrograph were crystalline $Y_3Al_5O_{12}$, and the dark portions $Al_2OC$. The widths of these phases observed in the polished section were up to about 3 micrometers.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. Fused, crystalline eutectic material comprising eutectic of at least (i) crystalline, complex $Al_2O_3 \cdot Y_2O_3$, and (ii) at least one of aluminoxy-D or M-aluminoxy-D, wherein D is at least one of carbide or nitride, and M is at least one metal cation other than Al.

2. The fused, crystalline eutectic material according to claim 1 comprising, on a theoretical oxide basis, at least 40 percent by weight $Al_2O_3$, based on the total metal oxide, carbide, and/or nitride content said eutectic material.

3. The fused, crystalline eutectic material according to claim 2, wherein (ii) comprises at least one of aluminum oxycarbide or aluminum oxynitride.

4. The fused, crystalline eutectic material according to claim 2, further comprising primary crystals of at least one of aluminoxy-D or M-aluminoxy-D, wherein D is at least one of carbide or nitride, and M is at least one metal cation other than Al.

5. The fused, crystalline eutectic material according to claim 2, wherein M is at least one of Ti, Mg, Sr, Ca, Ba, Zr, or Sc, and wherein said eutectic material further comprises at least one of M-boride, M-carbide, M- oxycarbide, M-nitride, or M-oxynitride.

6. The fused, crystalline eutectic material according to claim 2, wherein M is B, and wherein said eutectic material further comprises at least one of boron carbide, boron oxycarbide, boron nitride, or boron oxynitride.

7. The fused, crystalline eutectic material according to claim 2 comprising colonies of said eutectic, wherein said colonies have an average size of less than 100 micrometers.

8. The fused, crystalline eutectic material according to claim 7, wherein said colonies have an average size of less than 50 micrometers.

9. The fused, crystalline eutectic material according to claim 2 comprising colonies of said eutectic, wherein crystals making up said colonies are, on average, up to 10 micrometers in size.

10. The fused, crystalline eutectic material according to claim 9, wherein said crystals are, on average, up to 1 micrometer in size.

11. The fused, crystalline eutectic material according to claim 2, further comprising at least one of crystalline rare earth oxide or crystalline complex $Al_2O_3$.rare earth oxide.

12. The fused, crystalline eutectic material according to claim 2 further comprising at least one of crystalline BaO, CaO, $Cr_2O_3$, CoO, $Fe_2O_3$, $HfO_2$, $Li_2O$, MgO, MnO, NiO, $SiO_2$, $TiO_2$, $Na_2O$, SrO, $Sc_2O_3$, $V_2O_3$, ZnO, $ZrO_2$, or complex $Al_2O_3$.metal oxide thereof.

13. The fused, crystalline eutectic material according to claim 2, further comprising crystalline $ZrO_2$.

14. The fused, crystalline eutectic material according to claim 2 having an average microhardness of at least 13 GPa.

15. The fused, crystalline eutectic material according to claim 1 further comprising primary crystals of $Y_3Al_5O_{12}$.

16. The fused, crystalline eutectic material according to claim 1, further comprising primary crystals of crystalline $Al_2O_3$.

17. The fused, crystalline eutectic material according to claim 1, wherein said eutectic is aluminum oxycarbide-$Y_3Al_5O_{12}$ eutectic.

18. The fused, crystalline eutectic material according to claim 1, wherein said eutectic is aluminum oxynitride-$Y_3Al_5O_{12}$ eutectic.

19. The fused, crystalline eutectic material according to claim 1, wherein said eutectic is aluminum oxycarbonitride-$Y_3Al_5O_{12}$ eutectic.

20. The fused, crystalline eutectic material according to claim 1 further comprising crystalline $ZrO_2$.

21. The fused, crystalline eutectic material according to claim 1, wherein said complex $Al_2O_3 \cdot Y_2O_3$ further comprises at least one cation selected from the group consisting of Cr, Ti, Sc, Fe, Mg, Co, Ca, Si, Co, Ce, Dy, Er, Eu, Gd, Ho, La, Lu, Nd, Pr, Sm, Th, Tm, Yb, Mn, V, Cu, Ni, Cu, Sr, and combinations thereof.

22. The fused, crystalline eutectic material according to claim 1, wherein a portion of said complex $Al_2O_3 \cdot Y_2O_3$ Y cations are substituted with at least one cation of an element selected from the group consisting of: Ce, Dy, Er, Eu, Gd, Ho, La, Lu, Nd, Pr, Sm, Th, Tm, Yb, and combinations thereof.

23. The fused, crystalline eutectic material according to claim 1, wherein a portion of said complex $Al_2O_3 \cdot Y_2O_3$ Y cations are substituted with at least one cation of an element selected from the group consisting of: Fe, Ti, Mn, V, Cr, Co, Ni, Cu, Mg, Ca, Sr, and combinations thereof.

24. A method for making fused, crystalline eutectic material comprising eutectic of at least (i) crystalline, complex $Al_2O_3 \cdot Y_2O_3$, and (ii) at least one of aluminoxy-D or M-aluminoxy-D, wherein D is at least one of carbide or nitride, and M is at least one metal cation other than Al, said method comprising:

melting at least one $Al_2O_3$ source and at least one $Y_2O_3$ source to provide a melt, wherein at least one source of nitrogen or carbon is provided in said melt; and converting the melt to said fused, crystalline material.

25. The method according to claim 24, wherein said method includes cooling the melt with metallic plates.

26. The method according to claim 24, wherein said method includes cooling the melt with metallic balls.

* * * * *